Feb. 4, 1969     E. A. KNOWLTON     3,425,473
WASHER-NUT COMBINATION HAVING A FRANGIBLE CONNECTING ELEMENT
Filed Oct. 25, 1966

Inventor:
Edward A. Knowlton,
by James R. O'Connor
Atty.

United States Patent Office 3,425,473
Patented Feb. 4, 1969

3,425,473
WASHER-NUT COMBINATION HAVING A FRANGIBLE CONNECTING ELEMENT
Edward A. Knowlton, Winchester, Mass., assignor, by mesne assignments, to United-Carr Incorporated, Boston, Mass., a corporation of Delaware
Filed Oct. 25, 1966, Ser. No. 589,441
U.S. Cl. 151—38    3 Claims
Int. Cl. F61b 39/22, 43/00, 31/00

ABSTRACT OF THE DISCLOSURE

In a washer-nut combination a dome-shaped sheet metal washer has a nut joined to its outer face by a nonmetallic, highly frangible bonding element.

---

This invention relates generally to fasteners and more particularly to a washer-nut combination having a frangible connection therebetween.

An object of the invention is to provide a breakaway washer-nut assembly wherein the washer and nut are joined by a frangible connection whereby upon application of the combination to the shank of a cooperating fastener member which protrudes from an apertured workpiece, the frangible connection will give way as the washer is pressed against the surface of the workpiece and allow the nut to be further tightened without corresponding rotation of the washer.

Another object of the invention is to provide a breakaway washer-nut combination wherein the nut is adapted to swivel about the adjacent surface of the washer when the frangible connection is severed to provide for flush circumferential engagement of the undersurface of the washer with the surface of a workpiece in situations wherein the shank of a mating fastener member is skew to the plane of the workpiece surface.

Heretofore it has been known to permanently connect a dome-shaped or concavely contoured washer to a nut such that the washer and nut are freely rotatable with respect to one another. An example of such an arrangement is the disclosure of U.S. Patent 2,943,661 to W. Stern.

The function of a freely rotatable combination such as the aforementioned patentee's is to allow the nut to be further torqued on to a bolt after the washer engages the surface of a workpiece without additional rotation of the washer. Thus the washer does not cut a groove in the surface of the workpiece or otherwise damage same. In addition, the dome-shaped washer is pressed towards the surface of the workpiece to impart an upward tension on the nut as a locking feature, and also provides a takeup to compensate for possible thermal expansion of the bolt responsive to changing environmental conditions. However, as one will readily observe, the Stern combination requires a special nut having an undercut groove to receive a mating flange on the washer, and the collar forming the inside wall of the groove must be flared outwardly to retain the components in assembly. The last-mentioned operation must be carried out with extreme care to insure that the collar does not bind on the washer and inhibit relative rotation of the components. Conversely, the nut and washer of the present invention are joined solely by a highly frangible bonding element which breaks away when relatively low torque is exerted on the nut, thereby insuring free rotation of the nut with respect to the washer.

The C. E. Schutte U.S. Patent 2,770,161 discloses a special semi-spherical compensating washer for use in situations where the shank of a bolt extends at other than a right angle from the surface of a workpiece. The Schutte disclosure does not depict an assembly wherein the nut is initially secured to the washer; but in practice it has been customary to provide some connection since original equipment manufacturers, particularly in the automobile industries, demand a pre-assembled combination. The Schutte washer is therefore presently marketed with a special nut having a collar which is turned under the dome of the washer and provides a track for sliding the nut along the washer edges defining the transverse slot. Thus like the Stern combination the commercial version of the Schutte washer requires a special nut and the assembly of the nut to the washer must be carefully controlled lest the collar bind on the internal edges of the washer and inhibit movement of the nut along the slot.

The preferred embodiment of the present breakaway washer nut assembly is therefore seen to represent a definite improvement over the commercial version of the Schutte washer in that the nut will swivel freely on the upper surface of the washer once the frangible connection between the two is severed.

A washer-nut combination according to the present invention includes a dome-shaped sheet metal washer having a central opening for receiving the shank of a male fastener member such as a stud or bolt and a nut having a peripheral base flange joined to the washer by a synthetic resinous, highly frangible bonding element. The bonding element is located between the undersurface of the base flange of the nut and the outer face of the washer and extends from adjacent the outer edge of the flange inwardly toward the body proper of the nut. The bond between the washer and the nut is sufficiently strong to maintain the parts in assembly for ease of handling and to withstand the prevailing torque incident to the initial turning of the nut onto the shank of a stud or bolt so that the combination rotates as a unit. However as soon as increasing tightening torque in excess of the prevailing torque is applied to the nut, the bonding element breaks away from either the nut or washer or both allowing the nut to be further tightened without corresponding rotation of the washer. Since the synthetic resinous bonding element usually remains trapped between the opposed surfaces of the nut and washer during final tightening of the nut, it acts as a buffer which reduces the coefficient of friction between the confronting surfaces of the parts and thereby further lessens the possibility of continued rotation of the washer. In a preferred embodiment of the invention the central opening in the washer has a diameter which is substantially greater than the diameter of the shank of the cooperating stud or bolt. Thus in situations wherein the shank lies at other than a right angle to the surface of a workpiece through which it extends, the nut will swivel about the outer face of the washer, subsequent to the breakaway, to compensate for this condition and will urge the lower edge or face of the washer into flush circumferential engagement with the confronting surface of the workpiece.

In addition to the specific objects and advantages recited above, further advantages of the present washer nut combination will become evident from a reading of the following detailed description in conjunction with a viewing of the accompanying drawings in which.

Figure 1:
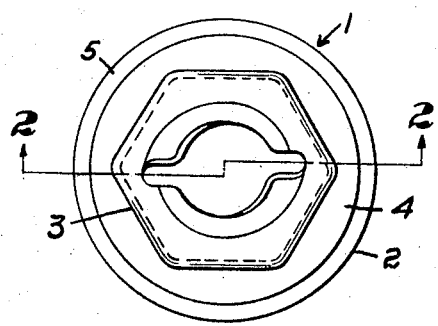
FIG. 1 is a top plan view of one form of the washer nut combination.
Figure 2:
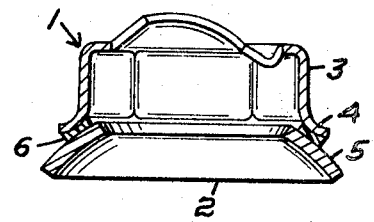
FIG. 2 is a section taken on line 2—2 of FIG. 1.

The washer-nut combination 1 shown in FIGS. 1 and 2 includes a dome-shaped, resilient, sheet metal washer 2 and a sheet metal nut 3 of the self-threading type having a peripheral flange 4 which is bonded to the outer concave surface 5 of the washer by a frangible connecting element 6. In test samples of the washer-nut combination manufactured to date, soft polyvinyl chloride (plastisol) of 20 durometer has been used as the bonding element. However, it is anticipated that other adhesvie materials which would perform in an equally efficient manner might be utilized.

Figure 4:
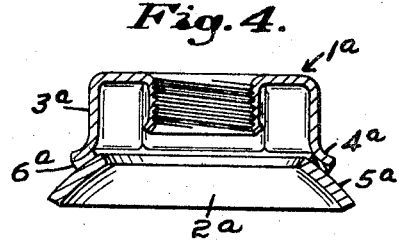
FIG. 4 is a sectional view of an alternate form of the washer-nut combination.

FIG. 4 depicts an alternate form of the washer-nut combination wherein the sheet metal nut 3a has an internally threaded central portion.

Figure 5:
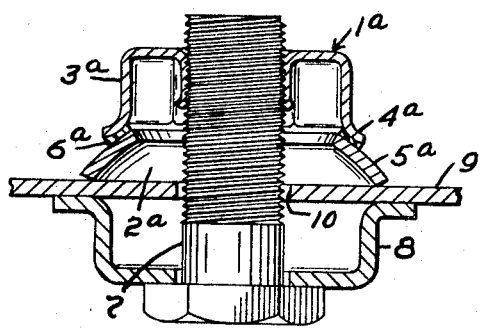
FIG. 5 is a sectional view of an installation wherein the nut is turned onto the shank of a bolt which extends perpendicularly from an apertured workpiece.

FIG. 5 is illustrative of an installation wherein the washer-nut combination of FIG. 4 is employed in conjunction with a cooperating threaded bolt 7 to secure a channel 8 to an apertured workpiece 9. In this instance the threaded shank of the bolt extends through the aperture 10 at right angles to the surface of the workpiece against which the washer bears. As the nut is initially turned on to the threaded shank the washer rotates along with it until the lower edge of the washer is brought to bear against the upper surface of the workpiece. Thereafter the increased torque necessary to fully tighten the nut on the bolt causes a severance of the adhesive material 6a from the surface of the washer and the latter ceases to rotate responsive to further turning of the nut. One will appreciate that the plastic material which remains between the flange 4a of the nut and the upper surface 5a of the washer provides a buffer having a relatively low coefficient of friction which facilitates rotation of the nut independently of the washer once the bond to the latter is severed. Thus the workpiece engaging edge of the washer does not cut a groove in the surface of the workpiece but rather remains stationary, and the dome of the washer is pressed downwardly creating an upward pressure or tension on the nut to lock the interengaging threads of the bolt and nut. In addition, the spring metal washer provides a takeup which will automatically compensate for any internal expansion of the bolt shank.

Figure 3:
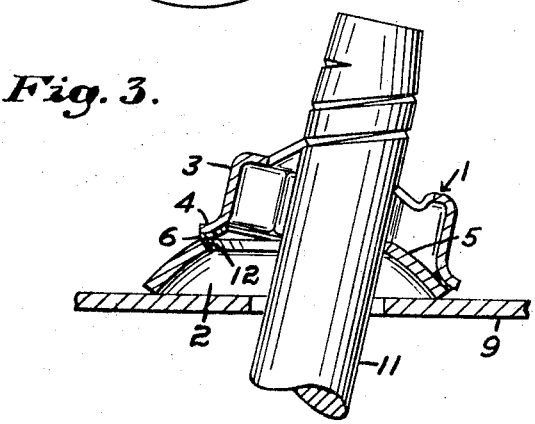
FIG. 3 is a sectional view of an installation depicting the nut turned onto the shank of a cooperating fastener which is skew to the plane of an apertured workpiece, the shank being shown in full.

In the assembly depicted in FIG. 3 the washer-nut combination of FIGS. 1 and 2 is applied to the shank 11 of a fastener member which extends at other than right angles from the workpiece 9. In other words the shank 11 is skew to the surface of the workpiece against which the washer ultimately bears.

As previously noted with respect to FIG. 5 the washer-nut combination 1 is turned onto the shank 11 as a unit until the lower edge of the washer is pressed against the surface of the workpiece whereupon the bond between the washer and nut is broken and the nut swivels on the outer surface 5 of the washer (to the right as viewed in FIG. 3) and continues to press the washer against the panel. Since the diameter of the opening 12 in the washer is substantially greater than the diameter of the shank 11, the washer is readily urged to the left as the nut is fully tightened and its lower edge is brought into flush peripheral engagement with the surface of the workpiece. Thus the invention automatically compensates for the skew relationship between the shank and the workpiece surface to effect the desired flush circumferential engagement of the washer against the workpiece.

Figure 6:
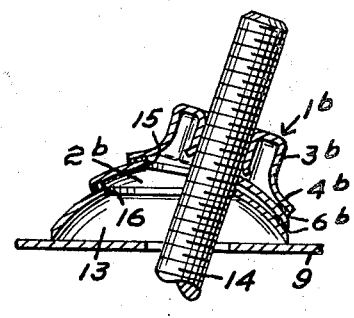
FIG. 6 is a sectional view of an installation similar to FIG. 3 wherein another form of the invention is utilized.

FIG. 6 discloses still another form of the invention wherein the flange 4b of the nut 1b is bonded to a first washer 2b which in turn is bonded to a second washer 13. The combination is applied to the shank of a threaded bolt which has more pronounced angularity with respect to the plane of the workpiece 9 than the shank 11 of FIG. 3. The diameter of the opening 15 in the washer 2b is greater than the diameter of the bolt shank 14 and the diameter of the opening 16 in the washer 13 is greater than that of the opening 15. Thus when the bonds between the two washers and the upper washer and the nut are broken, the nut swivels to the right on washer 2b and the latter swivels on washer 13 and the final tightening of the nut urges each of the washers to the left and downwardly to effect a full peripheral engagement of the lower edge of washer 13 with the workpiece surface.

While the structure and function of several forms of the invention have been described in detail, it is to be understood that the disclosure is not to be interpreted in a limiting sense in that the scope of the invention is best defined by the following claims.

I claim:

1. A washer-nut combination for compensating for other than a perpendicular relationship between the shank of a male fastener member and a surface of a workpiece through which the shank extends comprising a generally dome-shaped washer including convex and concave surfaces having a central, generally circular, shank-receiving opening, the convex surface defining a continuous, smooth surface of revolution between the peripheral margins thereof, said opening having a diameter considerably greater than the diameter of the shank, and a nut having internal thread means and having a peripheral outwardly extending base flange joined to the convex surface of said washer by a nonmetallic, highly frangible bonding element, the undersurface of said base flange having a contour generally complementary to the convex surface of said washer, said bonding element being disposed between the undersurface of said base flange and the convex surface of said washer and extending from adjacent the peripheral edge of said flange inwardly toward the body proper of said nut.

2. A washer-nut combination according to claim 1 wherein said washer to which said nut is joined is in turn joined to a second washer by a nonmetallic, highly frangible bonding element, said second washer having a central, generally circular opening having a diameter greater than the diameter of the opening in said washer to which said nut is joined.

3. A washer-nut combination according to claim 1 wherein said bonding element is a synthetic resinous material.

References Cited

UNITED STATES PATENTS

| 2,520,259 | 8/1950 | Pummill | 151—19 |
| 2,770,161 | 11/1956 | Schutte | 85—50 |
| 2,851,079 | 9/1958 | Heller | 151—38 |
| 2,996,735 | 8/1961 | Knocke | 151—38 |
| 1,874,462 | 8/1932 | Crowther | 151—37 |
| 2,754,872 | 7/1956 | Poupitch | 151—37 |

CARL W. TOMLIN, *Primary Examiner.*

RAMON S. BRITTS, *Assistant Examiner.*

U.S. Cl. X.R.

85—61, 50